United States Patent
Studenỹ

(10) Patent No.: US 11,256,859 B2
(45) Date of Patent: Feb. 22, 2022

(54) EXTENDING A CLASSIFICATION DATABASE BY USER INTERACTIONS

(71) Applicant: Avast Software s.r.o., Prague (CZ)

(72) Inventor: Pavel Studenỹ, Prague (CZ)

(73) Assignee: Avast Software s.r.o., Prague (CZ)

( * ) Notice: Subject to any disclaimer, the term of this patent is extended or adjusted under 35 U.S.C. 154(b) by 1431 days.

(21) Appl. No.: 15/272,961

(22) Filed: Sep. 22, 2016

(65) Prior Publication Data

US 2017/0083607 A1    Mar. 23, 2017

Related U.S. Application Data

(60) Provisional application No. 62/221,962, filed on Sep. 22, 2015.

(51) Int. Cl.
*G06F 16/90* (2019.01)
*G06F 40/174* (2020.01)
*G06F 16/958* (2019.01)

(52) U.S. Cl.
CPC .......... *G06F 40/174* (2020.01); *G06F 16/958* (2019.01)

(58) Field of Classification Search
CPC ............................... G06F 17/243; G06F 16/30
USPC ....................................................... 707/740
See application file for complete search history.

(56) References Cited

U.S. PATENT DOCUMENTS

| | | | |
|---|---|---|---|
| 8,805,838 B1 | 8/2014 | Khoshnevisan et al. | |
| 8,849,725 B2 | 9/2014 | Duan et al. | |
| 9,055,343 B1 * | 6/2015 | Lewis | H04N 21/44204 |
| 2003/0126235 A1 * | 7/2003 | Chandrasekar | G06F 16/951 |
| | | | 709/220 |
| 2003/0145001 A1 * | 7/2003 | Craig | G06F 16/3329 |
| 2008/0162473 A1 * | 7/2008 | Fitzer | G06F 16/2455 |
| 2012/0110645 A1 * | 5/2012 | Spalka | H04L 63/083 |
| | | | 726/4 |
| 2014/0143164 A1 * | 5/2014 | Posse | G06Q 10/105 |
| | | | 705/319 |
| 2015/0154316 A1 * | 6/2015 | Lightner | G06F 16/2468 |
| | | | 707/723 |

* cited by examiner

*Primary Examiner* — Jau Shya Meng
(74) *Attorney, Agent, or Firm* — Avek IP, LLC; William B. Kircher

(57) ABSTRACT

Web page items and other requests can be automatically categorized. An interaction with a web page item can be categorized based on previous categorizations of other web page items in which the same or similar data has been entered into a web page. A classification database containing categories of classified web page items is maintained. An interaction database containing interaction records of a user is maintained. The interaction records include a value corresponding to the user and a web page item. A web page item on a web page visited by a user and that is a user-fillable field that has been previously categorized in the classification database may be automatically populated with a value stored in an interaction database and that corresponds to the user and the user-fillable field.

20 Claims, 4 Drawing Sheets

EXTENDING A CLASSIFICATION DATABASE BY USER INTERACTIONS

CROSS-REFERENCE TO RELATED APPLICATIONS

This application claims priority to U.S. Provisional Patent Application Ser. No. 62/221,962, filed on Sep. 22, 2015 to Pavel Studený, entitled Extending a Classification Database by User Interactions, the entire disclosure of which is incorporated herein by reference.

FIELD

The disclosure relates generally to web browsers, and more particularly, to extending a classification database of web page components by utilizing user interactions.

BACKGROUND

Web pages typically contain many interactive components, such as forms and their inputs, content requests (e.g., video, audio) etc. It can be a difficult task for a computer to guess a category of such web page components from the contents of the web page or from the contents of the components themselves. For example, finding a phone number input on a form typically requires a complex language processing and proximity detection. Distinguishing a sports video from a documentary might require a complex object and scene detection algorithm. Such processing can be time consuming operations even for modern hardware, and can put significant demands on the processor, memory and network resources of a computer system, which in turn can have a significant impact on battery life.

SUMMARY OF THE INVENTION

Systems and methods enable web page items, such as user-fillable fields, and other requests to be automatically categorized. An interaction with a web page item can be categorized based on previous categorizations of other web page items in which the same or similar data has been entered into a web page. A classification database containing categories of classified web page items is maintained. An interaction database containing interaction records of a user is maintained. The interaction records include a value corresponding to the user and a web page item. A web page item on a web page visited by a user and that is a user-fillable field that has been previously categorized in the classification database may be automatically populated with a value stored in an interaction database and that corresponds to the user and the user-fillable field.

Methods and related systems include detecting an interaction with a web page item, searching an interaction database for interaction records that match a data input value provided for the interaction with the web page item, and determining a category for the web page item based on the interaction records having a data value that matches the data value provided as input for the interaction with the web page item. Methods and related systems further include identifying a user corresponding to detected interaction with the web page item, maintaining an interaction database and adding an interaction record indicative of the user's detected interaction with the webpage item, wherein the interaction record includes a value corresponding to the user and the web page item. Methods and related systems further include detecting first and second user interactions with a user-fillable field and, in response to the user's second interaction with the user-fillable field, retrieving from the interaction record in the interaction database the value corresponding to the user and the user-fillable field and enabling the retrieved value to be populated in the user-fillable field.

BRIEF DESCRIPTION OF THE DRAWINGS

For a better understanding of the inventive subject matter, reference may be made to the accompanying drawings in which.

DETAILED DESCRIPTION

Figure 1:
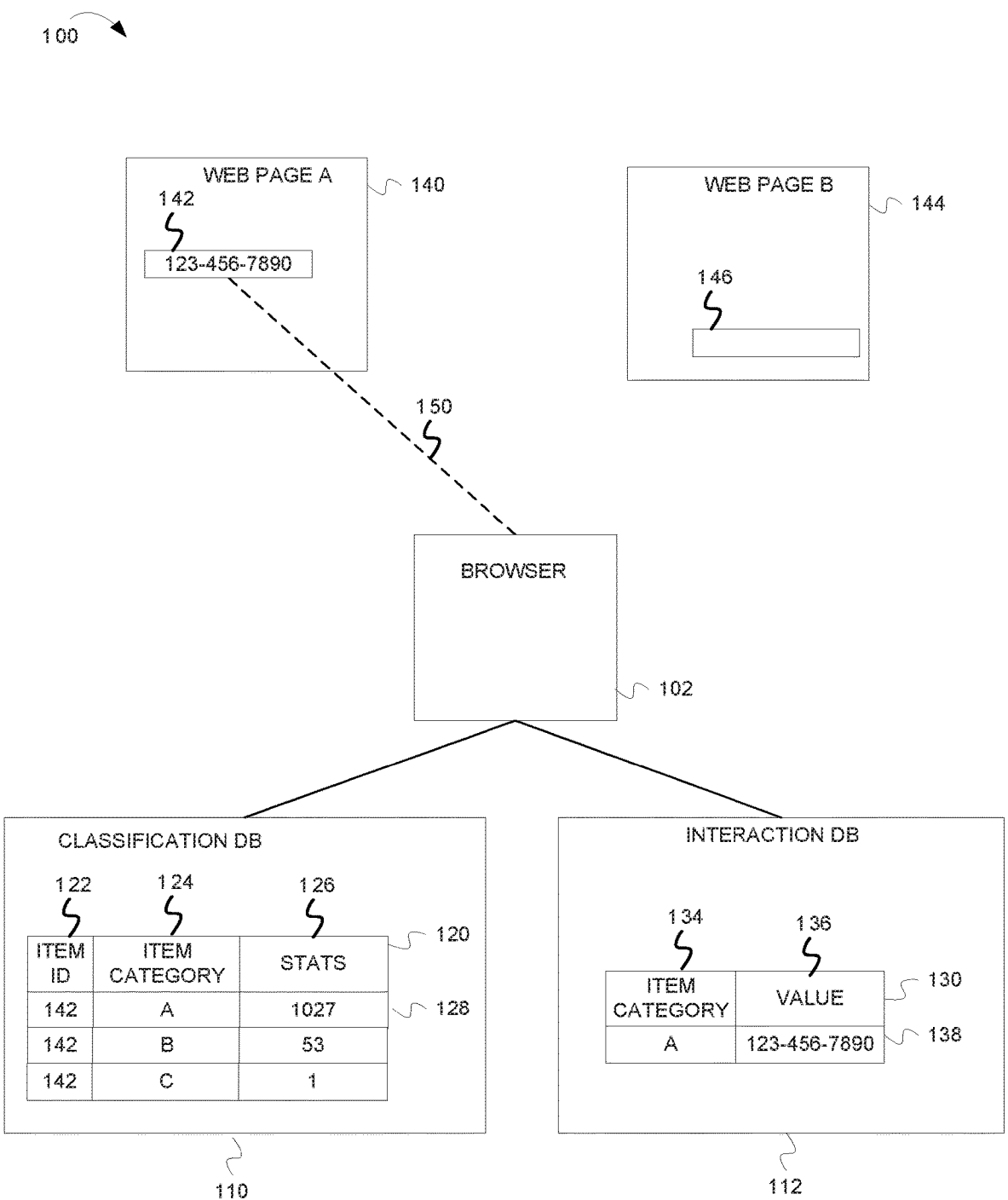
FIG. 1 is a block diagram illustrating an example initial state of a system that classifies web page items based on user interaction with the web page items.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating an example initial state 100 of a system that classifies web page items based, at least in part, on user interaction with the web page items. In some embodiments, system 100 includes a browser 102 and a classification database 110.

Browser 102 can be any type of web browser application such as MICROSOFT® INTERNET EXPLORER®, MICROSOFT EDGE™, GOOGLE® CHROME®, MOZILLA® FIREFOX®, APPLE® SAFARI® etc. The embodiments are not limited to any particular browser.

Classification database 110 comprises a database of categorized web page items 120. An item record for a web page item has an item identification field 122 and an item category field 124. The item identification field contains a value that identifies a web page item of a web page component. For example, the identifier may uniquely identify a form, video, or input field of a web page. Item category 124 identifies a category for the web page item. In some embodiments, a category can be any of a surname, city, street name, door number, some or all of a credit card number etc. The category can also be a combination of items. For example, the category could be a door number plus street name. The inventive subject matter is not limited to any particular type of category. The web page items may be categorized in a number of different ways. For example, in some aspects, some web page items may be categorized manually in order to provide initial seed data. Alternatively, some or all of classification database 110 may include web page item categorizations that have been purchased from a third party that can serve as seed data. In some embodiments, an item record may include statistical information 126 that maintains data regarding the classification of a particular web page item. For example, the statistical information may include a count of the number of users that have contributed data for a particular category. In the example illustrated in FIG. 1, web item 142 has been categorized 1027 times as category "A", 53 times as category "B", and 1 time as category "C".

Classification database 110, in some embodiments, is accessible by more than one user. That is, multiple instances of browser 102 of different users can access and modify data in classification database 110.

Interaction database 112 can include interaction records 130 associated with a user. An interaction record can include a web page item category 134 identifying a particular type of activity performed for the web page item category. Further, an interaction record can contain a value 136 associated with the activity. For example, an interaction record may identify an activity performed by a user, such as selection of a web page item, filling in a type of value on a web page item etc.

In some embodiments, interaction database 112 is associated with a particular user. Thus an instance of browser 102 may access the particular interaction database associated with the user of browser 102.

In the example illustrated in FIG. 1, a user of browser 102 has previously navigated to a web page A 140. Web page A 140 includes a web page item 142, which in the example is a field that is intended to receive a telephone number as input. For the purposes of the example, web page item 142 has been previously classified as category "A" as indicated by classification record 128. In the example, the user has previously interacted with web page item 142 by entering a telephone number "123-456-7890" into the field. The user's previous interaction with web page item 142 has caused an interaction record 138 to be added to the user's interaction database 112 that indicates that entering the user's telephone number is associated with category "A." The category may have been previously established based on a user entering data into a field that has already been categorized. In this example, the interaction of entering the telephone number can cause the input telephone number "123-456-7890" to be stored as interaction value 136. Thus the interaction record indicates that the value "123-456-7890" is filled into phone number inputs by this particular user. In some embodiments, interaction records are created for unique instances of data. For example, if the user has entered the same phone number into three input fields, there may be one interaction record for the phone number. Alternatively, if the user has entered two different phone numbers, the can be two interaction records, one for each phone number.

In the example initial state, item 146 of web page B 144 has not been classified yet. Thus there is no item record in classification database 110 for item 146.

Figure 2:
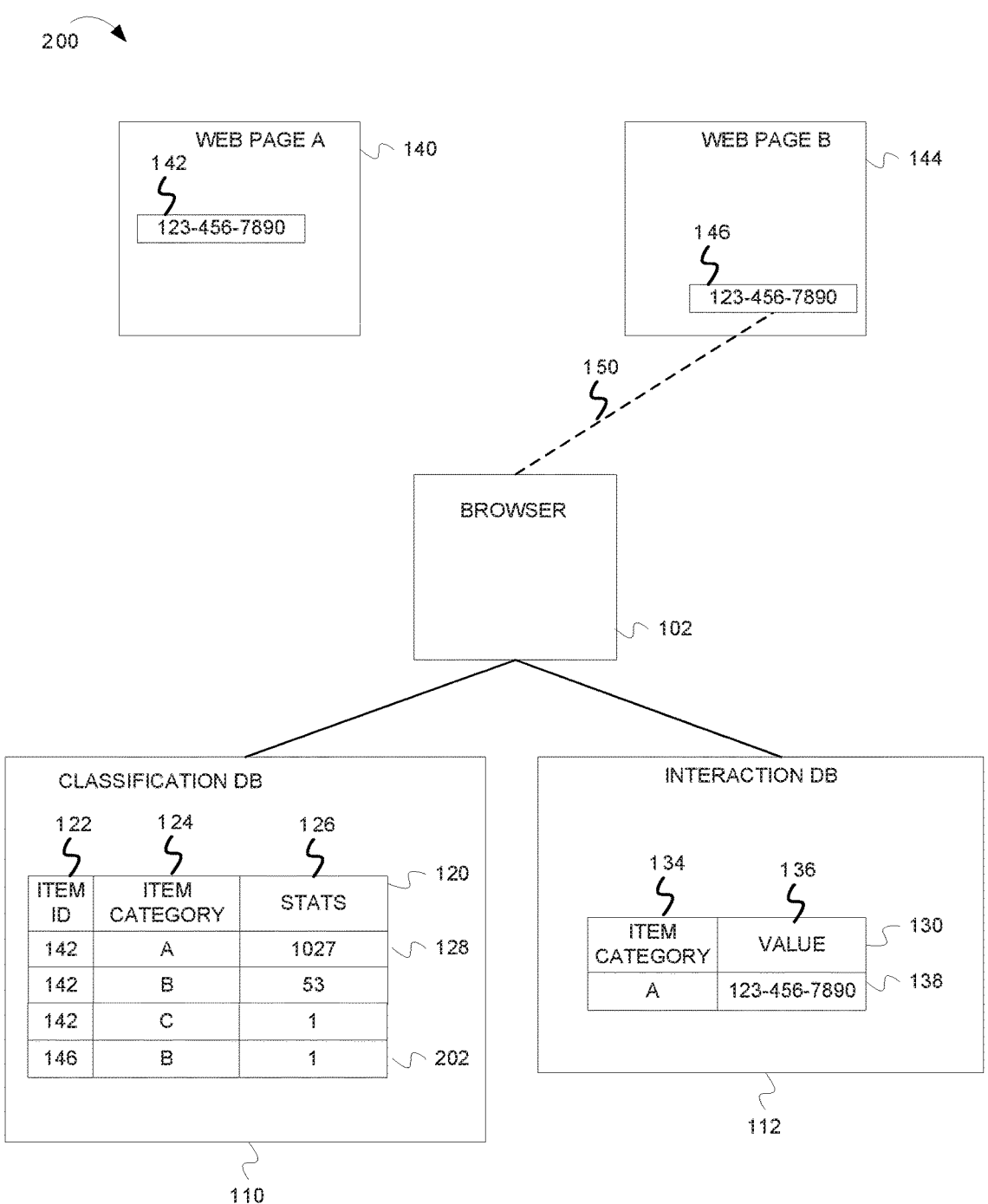
FIG. 2 is a block diagram illustrating a state of the system after extending the classification database to include additional web page items.

FIG. 2 is a block diagram illustrating a state 200 of the system after extending the classification database to include additional web page items. In this case, the user interacts with unclassified web page item 146 on web page B 144 by entering the telephone number "123-456-7890" into web page item 146. Thus the interaction is the same type of interaction as with web page item 142 on web page A 140. The user interaction database 112 can be queried for interaction records for that match the activity performed, and the resulting matches are selected as candidates for populating the item category 124 for the unclassified web page item 146. The category in the interaction records that matches the activity can be used to set the item category in the classification database. In this example, the telephone number entered into web page item 146 matches the value 136 of the interaction record for interaction 150. As a result of the match, interaction record 138 is selected. A classification record 202 is created where category 124 for web page item 146 is updated with the value "A" taken from the selected interaction record category 134.

It should be noted that although a browser 102 has been shown as performing the functions described herein, other entities could also perform the some or all of the functions. For example, a browser extension could be used to implement some or all of the functions. Alternatively, a password manager or a forms manager could also be configured to implement some or all of the functions. Still further, a server receiving forms, content requests etc. could be configured to perform some or all of the functions described herein.

Figure 3:
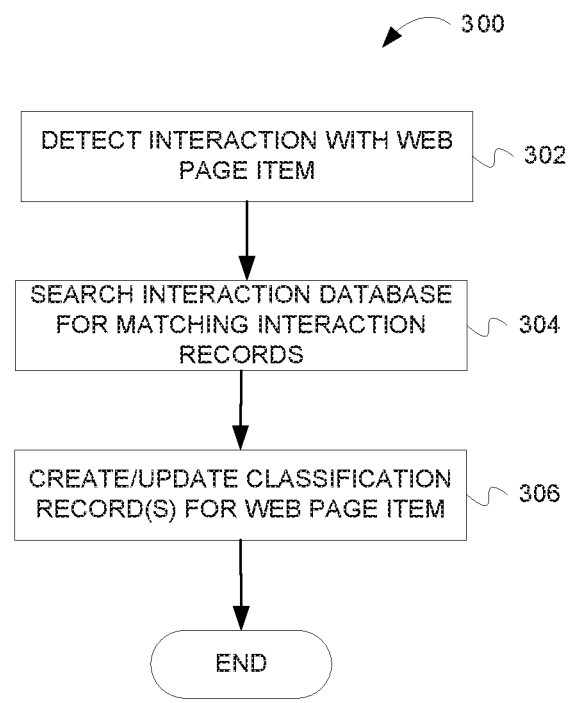
FIG. 3 is a flow chart 300 illustrating operations of a method for extending a classification database.

Further details on the operation of the above-described system will now be provided with reference to FIG. 3.

FIG. 3 is a flow chart 300 illustrating operations of a method for extending a classification database. At block 302, an interaction with a web page item is detected. For example, a browser or browser extension may detect that a form containing an item to be categorized is submitted to a server by a browser. Alternatively, a server responding to a request may detect an interaction. For example, a video provider may detect a request download and play a video. The request for the video can comprise the interaction and the server can use the methods described herein to categorize the interaction.

At block 304, the user's interaction records are searched for records that match the interaction detected at block 302. For example, in the case of a web page item that is an input text field, the user's interaction records where the text in a value field 136 of the interaction record match the text entered into the web page item can be returned.

At block 306, the matching interaction records selected at block 304 are used to create a classification for the web page item or to update a previously existing classification of the web page item. For example, if a new category is returned in the search results, a classification record associating the new category with the web page item can be created. Alternatively, if a category in the results set is already associated with the web page item, then statistics 126 for the category association can be updated. For example, statistics 126 may maintain a counter indicating the number of times the category has been identified in user interactions.

It should be noted that it is possible for classification database 110 to include improper categorizations for a web page item. For example, in some cases, a web page item may be improperly classified because users interact with the web page item in different ways. Alternatively, some users may interact in the same way with items that belong to different categories. Further, it may be the case that a proper category doesn't exist. Thus in some embodiments, the classification database may use statistics 126 to determine whether or not to return classification records. For example, the classification database may not return classification records that have not been categorized by a statistically significant number of users. The determination of what is statistically significant can vary depending on the nature of the service being provided. For example, in the case of malware detection, 500 users may comprise a statistically significant number of users. Other types of services may consider a greater or lesser number of users as statistically significant. Generally, the greater the threshold, the more precise the results of a category query will be. However, a larger threshold can also increase the number of items for which a query may return "no results." Further, even if a statistically significant number of users have categorized the web page item, a category may not be returned if there is not a single prominent category among the potential categories determined by user interactions. The determination of what comprises a "single prominent category" can vary. In some embodiments, a single prominent category may comprise a threshold percentage (e.g., if an item is categorized as "A" by 75% of the users, then "A" may be the single prominent category). Alternative determinations may be used. For example, a category may be a single prominent category if it is 60% greater than the second highest category. Or, a category may be determined as the single prominent category if it is greater than the sum of all other categories. Other means of determining a single prominent category are possible and such means are within the scope of the inventive subject matter.

Although the above examples have been described in the context of interactions comprising text entries (e.g., telephone numbers), other types of interactions may be categorized. For example, content requests such as video requests, audio requests, or image requests could also be categorized using the above-described systems and methods. As an example, consider requests for video content. Assume that there are video categories "music," "animals," "fun," and "sport." Some videos may be categorized manually as seed data, so it may be known that user Adam watches 55% "music" and 45% "animals." User Ben watches 40% "music," 30% "fun," 29% "sport" and 1% "animals."

Adam watches an uncategorized video named Wonderful World, so this creates a new record in the category database, that this video is with a 55% probability "music" and with 45% probability "animals." At this moment, there is no single prominent value, so nothing would be returned for a category query. However, now Ben watches Wonderful World as well, and his category records are added into the database. The category "animals" can likely be ruled out and the single prominent category may be determined to be "music."

Accordingly, for example, in the case of a user visiting a webpage that contains a form with web page items such as user-fillable entry fields with which the user has previously interacted, the system may identify the particular user using a small file (i.e., a cookie) that has been previously stored on the user's computing device for the purpose of enabling the system to subsequently recognize the user's computer. Alternatively and/or additionally, a password manager employing the features of the present invention may be used to identify the user. The password manager verifies the user's identity, using stored access credentials such as a username and/or password. The system accesses the classification database 110 and retrieves information regarding the category of one or more fillable entry fields on the webpage being visited. In particular, for a user-fillable field on the webpage, using the retrieved category information for the user-fillable field, the system retrieves from an interaction record in the interaction database 112 a value associated with the identified user for the retrieved category (e.g., a telephone number, credit card number, address information, etc.) and pre-populates the retrieved value from the interaction database 110 into the correspondingly categorized entry field.

Figure 4:
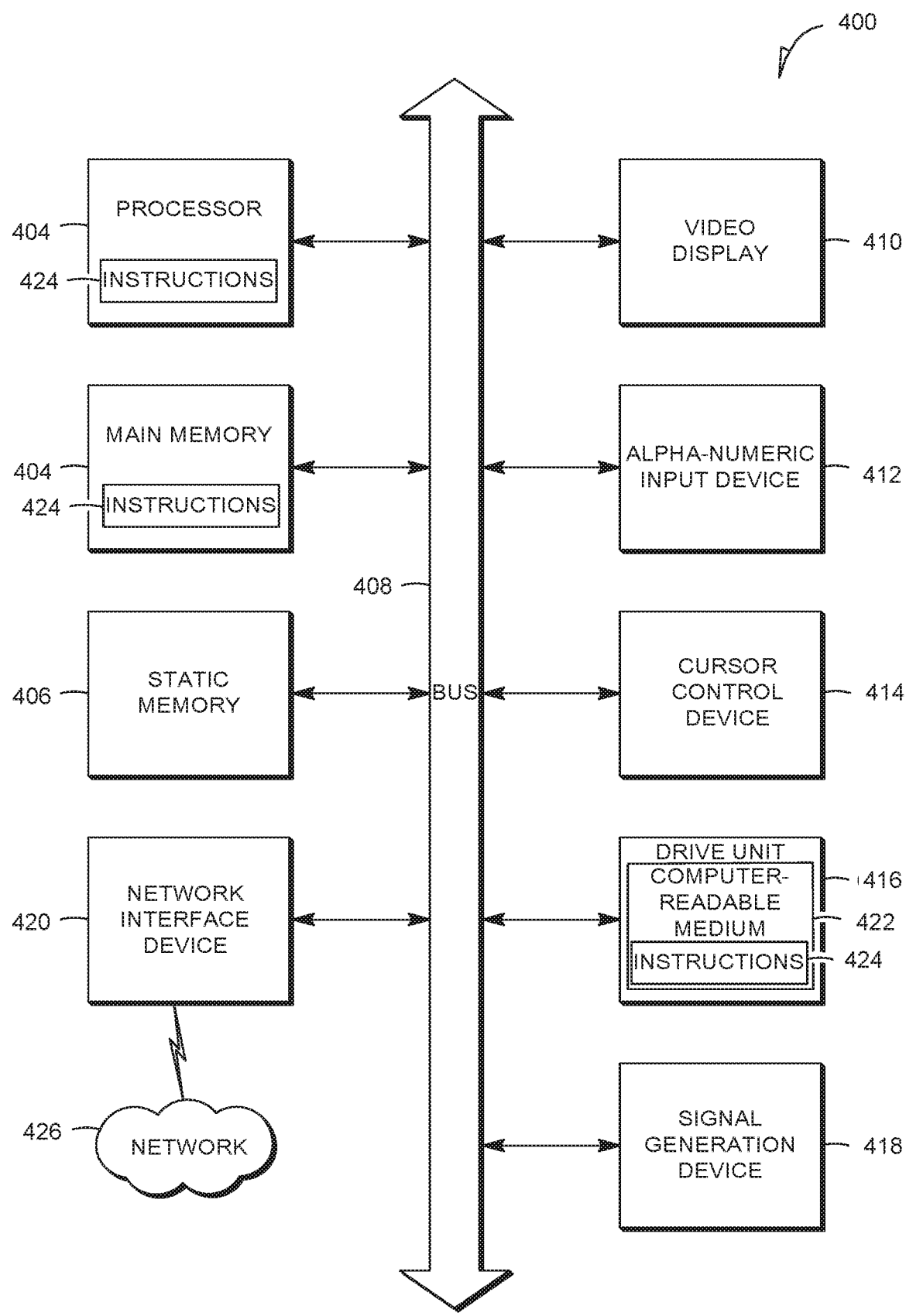
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 4 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
   detecting an interaction of a user with a web page item, wherein said web page item comprises a user-fillable field;
   searching an interaction database for interaction records corresponding to the user that match a data input value provided for the detected interaction with the web page item; and
   determining a category for the web page item based on the interaction records corresponding to the user having a data value that matches the data input value provided for the interaction with the web page item.

2. The method of claim 1, further comprising creating a classification for the web page item using the determined category.

3. The method of claim 1, further comprising updating a previously existing classification of the web page item.

4. The method of claim 1, wherein said determined category is already associated with the web page item, said method further comprising updating statistics corresponding to the web page item.

5. The method of claim 4, wherein said updating statistics corresponding to the web page item comprises updating a counter indicating the number of times the determined category has been identified in interactions by users with the web page item.

6. The method of claim 1, said method further comprising:
identifying the user corresponding to the detected interaction with the web page item; and
adding an interaction record indicative of the user's detected interaction with the webpage item, wherein said interaction record comprises a value corresponding to the user and the web page item.

7. The method of claim 6, wherein said identifying the user comprises identifying the user using access credentials stored in association with a password manager application.

8. The method of claim 6, wherein said interaction with the web page item that is detected is a first interaction with the web page item by the user, said method further comprising:
detecting a second interaction by the user with the web page item;
retrieving from the interaction record in the interaction database the value corresponding to the user and the web page item; and
populating the retrieved value in the user-fillable field.

9. The method of claim 1, wherein said interaction with the web page item that is detected is a first interaction with the web page item by the user, said method further comprising:
detecting a second interaction by the user with the web page item;
determining whether the web-page item has been categorized based on interactions by a statistically significant number of users; and
upon determining that said web-page has been categorized based on interactions by a statistically significant number of users, using a classification record corresponding to said web page item.

10. The method of claim 9 further comprising, upon determining that said web-page has been categorized based on interactions by a statistically significant number of users and it is determined that there is a single prominent category among a plurality of potential categories determinable by user interactions, using a classification record corresponding to said web page item.

11. The method of claim 1, said method further comprising providing a password manager application that performs at least one of said steps of detecting, searching, and determining.

12. The method of claim 1, wherein said detecting an interaction with a web page item comprises detecting a text entry.

13. The method of claim 1, wherein said detecting an interaction with a web page item comprises detecting a request for content comprising at least one of video, audio, and am image.

14. The method of claim 13, wherein said detecting an interaction with a web-page item comprises detecting a request for video, and wherein said determining a category for the web page item comprises determining a category of the video.

15. The method of claim 14, said method further comprising using information indicative of prior video viewing interactions by the user in making a determination that said video is in a particular category.

16. The method of claim 14, wherein the user is a first user, said method further comprising using information indicative of prior video viewing interactions by a second user in making a determination that said video is in a particular category.

17. A method comprising:
detecting a session by a user with a web page that displays a web page item, wherein said web page item comprises a user-fillable field;
determining a category for the web page item, wherein the category is based on interaction records corresponding to the user indicative of prior interactions with the web page item;
obtaining information indicative of the identity of the user;
searching an interaction database for at least one interaction record comprising information indicative of a prior user interaction by the user with the web page item, wherein said at least one interaction record comprises a value corresponding to the user and the web page item;
retrieving the value from the at least one interaction record; and
populating said retrieved value in said use r-fillable field.

18. A non-transitory computer readable medium containing program instructions for performing a method comprising:
detecting an interaction of a user with a web page item, wherein said web page item comprises a user-fillable field;
searching an interaction database for interaction records corresponding to the user that match a data input value provided for the interaction of the user with the web page item; and
determining a category for the web page item based on the interaction records corresponding to the user having a data value that matches the data value provided as input for the interaction with the web page item.

19. The non-transitory computer readable medium of claim 18, wherein said web page item wherein said interaction with the web page item that is detected is a first interaction with the web page item by the user, said non-transitory computer readable medium further containing program instructions for performing further steps of the method comprising:
identifying a user corresponding to the detected interaction with the web page item;
maintaining an interaction database and adding an interaction record indicative of the user's detected interaction with the webpage item, wherein said interaction record comprises a value corresponding to the user and the web page item;
detecting a second interaction by the user with the web page item;
retrieving from the interaction record in the interaction database the value corresponding to the user and the web page item; and
enabling the retrieved value to be populated in said use r-fillable field.

20. A non-transitory computer readable medium containing program instructions for performing a method comprising:
detecting a session by a user with a web page that displays a web page item, wherein said web page item comprises a user-fillable field;
determining a category for the web page item, wherein the category is based on interaction records of the user indicative of prior interactions with the web page item;

obtaining information indicative of the identity of the user;

searching an interaction database for at least one interaction record comprising information indicative of a prior user interaction by the user with the web page item, wherein said at least one interaction record comprises a value corresponding to the user and the web page item;

retrieving the value from the at least one interaction record; and enabling said retrieved value to be automatically populated in said user-fillable field.

\* \* \* \* \*